United States Patent [19]

Steltzer

[11] Patent Number: 4,875,635
[45] Date of Patent: Oct. 24, 1989

[54] PROGRAMMED RATIO MECHANICAL TRANSMISSION

[75] Inventor: Edward L. Steltzer, Westboro, Mass.

[73] Assignee: Digital Equipment Corporation, Maynard, Mass.

[21] Appl. No.: 104,814

[22] Filed: Oct. 2, 1987

[51] Int. Cl.$^4$ .................... B65H 18/10; B65H 23/04
[52] U.S. Cl. ............................. 242/67.3 R; 242/75.5
[58] Field of Search .................. 242/67.3 R, 196, 197, 242/200, 201, 202, 205, 75.5; 40/387, 471, 478, 483, 518–523

[56] References Cited

U.S. PATENT DOCUMENTS

| 1,402,009 | 1/1972 | Olop | 40/522 |
| 3,317,157 | 5/1967 | Leiber | 242/75.5 |
| 3,997,126 | 12/1976 | Karlsson | 242/107 |
| 4,084,765 | 4/1978 | Bonnaud | 242/107 X |

FOREIGN PATENT DOCUMENTS 1270918 6/1968 Fed. Rep. of Germany ...... 242/202

Primary Examiner—John M. Jillions
Attorney, Agent, or Firm—Nutter, McClennen & Fish

[57] ABSTRACT

A mechanical transmission system for transferring rotational motion between shafts comprising juxtaposed drums mounted on said shafts and a cable mechanically linking the drums. Each end of the cable is attached to the surface of one of the drums, and the cable is wound partly around each drum and maintained under tension. Preferably, the surfaces of the drums are continuously grooved, and the cable follows in the grooves. The cable is mounted such that as the cable is wound onto one drum it is unwound from the other drum. The drums can be of varying diameter through their lengths to continuously vary the ratio of angular velocities.

In a preferred embodiment, the mechanical transmission system is used in tensioning and transferring a flat web, such as magnetic recording tape, between two reels. Each of the reels is mechanically coupled to one of the drums, and the drums are frustoconical in shape and helically grooved. The drums are mounted inversely to each other such that the wide end of each drum is juxtaposed with the narrow end of the other, and the cable is attached near the wider end of each drum. The ratio of the radius of the narrow end of each drum to that of its wide end equals the ratio of the radius of its associated reel when empty to that of the reel when fully wound. The tape can be moved at constant speed by driving the cable at constant speed.

14 Claims, 2 Drawing Sheets

PROGRAMMED RATIO MECHANICAL TRANSMISSION

BACKGROUND OF THE INVENTION

A. Field of the Invention

This invention relates to a device to transmit motion from one rotating shaft to another, and more particularly to such a device in which there is a constantly changing ratio of angular velocities between the shafts.

B. Prior Art

Various types of linkages exist for transferring rotational motion from one shaft to another, including gears, belts and pulleys, rollers and the like. In general, these provide a fixed transmission ratio between the two shafts; that is, the angular velocity of the second shaft divided by that of the first is constant. Some linkage devices, such as cams and followers, provide variable transmission ratios, but they generally work only through a one-revolution cycle, or through several revolutions with relatively complex design.

When a wound flat web, such as magnetic tape or projection film, is moved from one reel to another, the ratio of the rotational speeds of the two shafts upon which the reels are mounted constantly changes because of the constantly changing diameters of the web on the two reels. On the other hand, it is often desired to move the web at a constant linear speed past some point, such as a record/playback head on a tape recorder or the object lens on a movie projector. For many purposes, it is also important to maintain a constant tension on the web as it moves, and while it is at rest. Constant tension is particularly important when moving a high-density digital magnetic tape over a read/write head, since tension variations can cause undue speed fluctuations at the head.

In some types of magnetic tape drives, the tape is driven at constant speed by the use of a capstan device directly driving the tape. However, this arrangement is unsuitable for high-speed, high-density digital computer tape drives. Therefore, such tapes are generally driven by individual reel motors with control circuits that operate to maintain constant linear speed. In such devices, opposing torques must be applied to the reel shafts to produce the desired web tension. However, this adds to the cost and complexity of the equipment, and requires an expenditure of energy to maintain tension even when the tape is at rest.

A tape cassette has been used which includes an internal means of providing tape tension. This is accomplished by providing an elastic band in the cassette, running in contact with the outside of the tape on the two reels, which acts as a driving and tensioning means. As the band is driven by an external motor, the band both drives the tape and keeps it tight. However, this requires the use of special cassettes, each one of which requires the elastic band device. Furthermore there have been problems maintaining constant tension when the tape is frequently stopped and started or reversed.

SUMMARY OF THE INVENTION

A. Objects of the Invention

Accordingly, it is an object of the present invention to provide a means for transmitting motion from one rotating shaft to another while providing a constantly changing ratio of the angular velocities of the shafts in accordance with a preselected program.

A further object of the present invention is to provide a means for transferring a spirally wound web at a constant lineal speed and tension from a reel on a first shaft to a reel on a second shaft.

Another object is to reduce the energy required to transfer such a web from reel to reel.

A further object is to use a constant-speed motor to drive a web between reels, without the use of a capstan drive on the web.

B. Brief Summary of the Invention

A transmission system embodying the present invention comprises two drums mounted on rotatable shafts. The drums are mechanically linked to each other by a cable which is partly wrapped around each of the drums, with each end of the cable attached to the surface of one of the drums. Preferably, the surfaces of the drums are continuously grooved, and the cable follows in the grooves. The rotation of one drum to enwind the cable causes the cable to unwind from and thus rotate the second drum. In addition, a torque mechanism, such as a spring or the like, biases the motion of the second drum against the pull of the cable. Thus when the first drum rotates in a direction to unwind cable, the torque mechanism causes the second drum to rotate in a winding direction.

Alternatively, the drums may be connected by a second transmission which causes the second drum to rotate in a direction to wind the cable as the first drum rotates in the unwinding direction. In the reel-to-reel web transfer systems discussed below, the web which is transferred between reels acts as the second transmission.

The cable is maintained under tension so that the amount of cable which winds onto one drum always equals the amount of cable which unwinds from the other drum. In the first case discussed above, the torque mechanism maintains constant tension on the cable. In the second case, tension can be maintained by a spring which connects two adjacent, functionally coupled components of the system, and which biases one component against the other in a direction to apply the desired tension to the cable and web. Alternatively, the cable can be elastic and thereby also function as the tensioning means.

A preferred embodiment of the present invention, is for use in transferring a flat web, such as magnetic recording tape, between two reels, preferably at constant speed and tension. The transmission system comprises two rotatable, frustoconical drums, preferably helically-grooved, each of which is mechanically coupled to one of the reels. The drums are mounted inversely to each other so that the wide end of each drum is juxtaposed with the narrow end of the other. They are mechanically linked to each other by a cable which is attached near the wide end of the first drum, wound partly around that drum, preferably in a helical groove therein, wound partly around the second drum in the same manner, and then attached at a point near the wide end of the second drum. The cable and web are mounted such that they move in opposite directions. That is, as the web winds onto a reel, the cable unwinds from the associated drum. For each associated drum and reel, the ratio of the radius of the narrow end of the drum to that of its wide end equals the ratio of the radius of the reel when empty to that of the reel when fully wound.

In operation, the cable is drawn away from one of the drums, which causes the cable to unwind from and rotate that drum. This in turn causes the reel associated with that drum to rotate in a winding direction, and thereby to draw the web onto itself. The drawing of the web unwinds the web from the second reel, causing that reel to rotate. This, in turn, rotates the second drum which winds the cable onto itself, thus completing a system loop. As discussed above, tension is maintained on the cable and, therefore throughout the system loop.

In a further preferred embodiment, each reel and its associated drum are mounted on separate shafts coupled by a gear with a given gear ratio. The drawing of the cable away from one drum still drives the system loop as discussed above. However, in this case the angular speed of each drum is equal to that of its associated reel divided by the gear ratio. For instance, in a system with a 10:1 gear ratio the drums will rotate at one-tenth the angular speeds of their associated reels.

When the web is a magnetic recording tape or the like, a motor preferably drives the cable directly and at constant linear speed. This in turn drives the web at constant linear speed without the need for a drive on the web itself.

DESCRIPTION OF THE DRAWINGS

The present invention, as well as further objects and advantages thereof, will be apparent from the following description and the accompanying drawings in which.

DETAILED DESCRIPTION OF THE INVENTION

Figure 1:
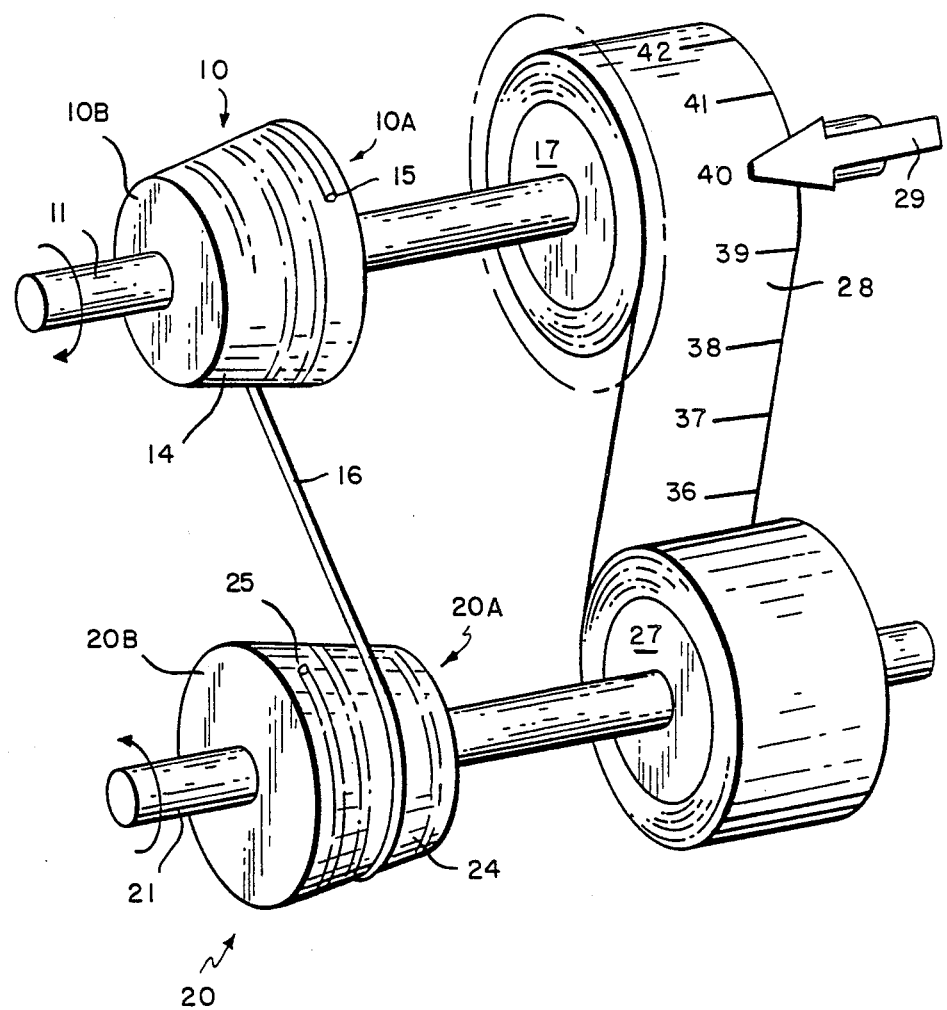
FIG. 1 is a schematic representation of an embodiment of the present invention with the reels mounted directly on the drum shafts.

FIG. 1 illustrates the application of the invention to a shaft rotation indicator. In this device, the rotation of shaft 11 in either direction causes indicator tape 28 to run past an indicating arrow 29. The indicator can operate through the full length of the tape, and can move in either direction with only internal friction to resist its motion.

A first generally frustoconical shaped drum 10, including a wider end 10A and a narrower end 10B, is mounted on a rotatable shaft 11. A second drum 20, of the same size and shape as drum 10, is mounted on a shaft 21 which is parallel to shaft 11. Drum 20 is mounted inversely to drum 10, with its narrower end 20A juxtaposed to wide drum end 10A, and its wider end 20B juxtaposed to narrow drum end 10B.

Drum 10 includes a continuous helical groove 14, and drum 20 includes a corresponding groove 24. A cable connector 15 is disposed at the end of groove 14 near the wide drum end 10A, and a corresponding cable connector 25 is disposed at the end of groove 24 near the wide drum end 20B. A cable 16, wrapped around the drums in grooves 14 and 24, is attached at one end to connector 15 and at its other end to connector 25. The cable is disposed in groove 14 for that portion of its length which is wound about drum 10, and disposed in groove 24 for that portion which is wound around drum 20. The length of the cable equals the length of the groove 14 or 24; however part of the cable is disposed on the drum 10 and part on the drum 20. In this manner the cable mechanically couples the drums to each other in a manner analogous to a conventional belt and pulley arrangement.

Reels 17 and 27 are mounted directly on shafts 11 and 21, and a web, in this case a indicating tape 28, is carried by the reels. When shaft 11 is rotated clockwise, as indicated, then cable 16 is enwound onto drum 10 and unwound from drum 20. This causes shaft 21 to rotate in a counterclockwise direction, thus resulting in tape 28 winding onto reel 27 from reel 17. Correspondingly, if the shaft 11 is rotated counterclockwise, the tape 28 is enwound onto reel 17 and unwound from reel 27. This causes shaft 21 to rotate in a clockwise direction, thus resulting in cable 16 winding onto drum 20 from drum 10. In either case the motion is carried through a full system loop.

In this embodiment, it can readily be seen that cable 16 and tape 28 must wind through the same angular displacement in radians about shafts 11 and 21. That is, the number of layers of tape wound on reel 17 must equal the number of turns of cable 16 wound on drum 20. The same applies to reel 27 and drum 10.

It is desirable to maintain tension in the system loop, so that the mechanical energy can be transmitted between components without slack, thus providing for smooth motion in either direction. In order to maintain tension in the illustrated system, cable 16 may be made of an elastic material, such as monofilament glass fishline, and installed with a desired degree of pre-tension. Alternatively, a spring connecting adjacent components could be used to provide the tension, as discussed further below.

In regard to the present invention, it should be understood that reference to the radius of the narrow end of the drum actually refers to the radius at the point of narrowest cross-section covered by the cable when the cable is fully wound onto the drum; and reference to the radius of the wide end of a drum actually refers to the radius of the drum at the point of widest cross-section in functional contact with the cable. That is, references to the wide and narrow ends of a drum are actually references to the widest and narrowest cross-sections of the drum which come in and out of contact with the cable as the web is fully wound and unwound. Any additional portions of the drum, which may be used, for example, for mounting support, or to hold additional windings of the cable which remain on the drum for anchoring purposes, would not functionally affect the operation of the system.

To provide a better understanding of the functional relationships of this system, let the radius of the narrow end of drum 10 be defined as $R_1$; that of the wider end as $R_2$; the radius of reel 17 when empty as $R_3$; and the radius of the reel with the tape fully wound on it as $R_4$. To maintain constant relative movement through the system, the ratio of radius $R_1$ to $R_2$ must equal the ratio of radius $R_3$ to $R_4$. If $R_1$ and $R_3$ are equal, then $R_2$ would equal $R_4$, and the functional length of the cable 16 would equal that of tape 28. Alternatively, $R_1$ can be larger or smaller than $R_3$ and the system will still work, as long as all of the other proportions are maintained. For instance, if $R_1$ were one-half $R_3$, then $R_2$ would have to be one-half $R_4$ to maintain the proportions. The rotational travel of cable 16 in radians would still be equal to that of tape 28, although the functional length of cable 16 would be about half the length of tape 28. Even when the reels are connected to the drums through gearing means, as discussed below, the ratios of the radii corresponding to $R_1$, $R_2$, $R_3$, and $R_4$ will still be the same.

If the hub of reel 17 is not the same diameter as that of reel 27, then this device can still be used as long as the same relationship of $R_1/R_2 = R_3/R_4$ is maintained on each shaft. Thus each drum would be proportional to its associated reel, even though the two drums would no longer be identical to each other.

Figure 2A:
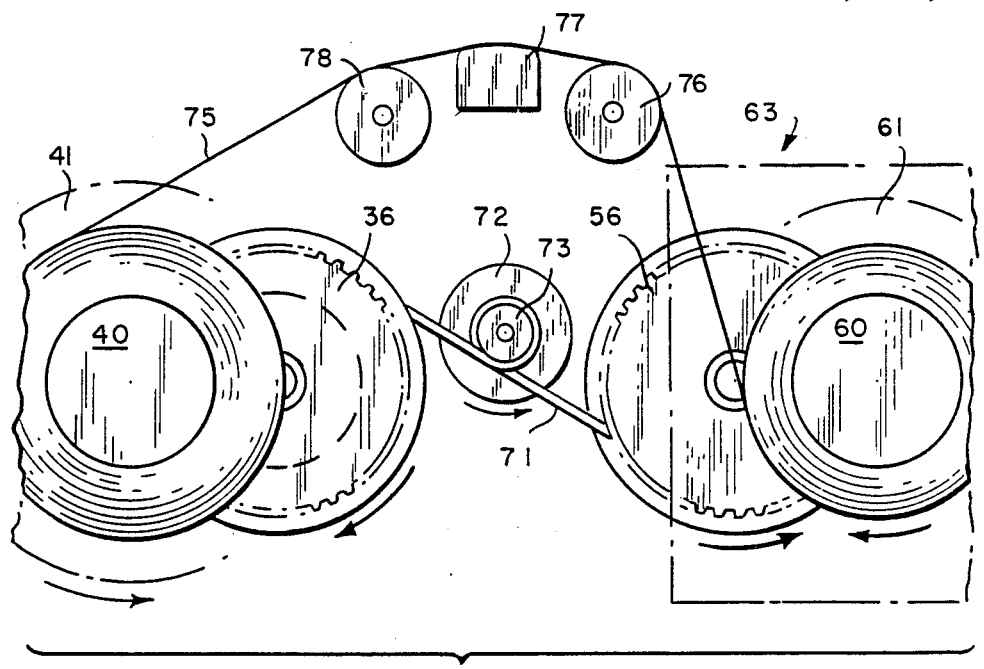
FIG. 2A is a schematic top view of the embodiment depicted in FIG. 2.
Figure 2:
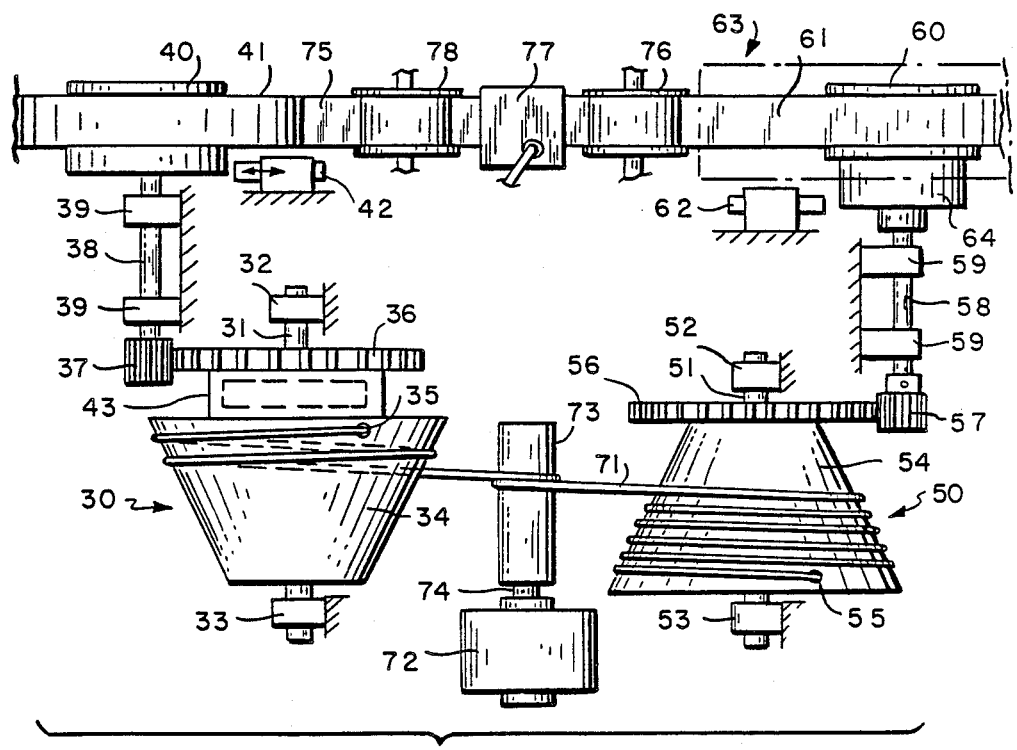
FIG. 2 is a schematic side view of a preferred embodiment of the present invention including gearing means and separate reel shafts.

Referring to FIGS. 2 and 2A, a magnetic tape transport mechanism made in accordance with a preferred embodiment of the present invention is shown. In this embodiment, the reels are mounted on separate reel shafts, and are connected to the drum shafts through step-down gearing means. A first frustoconical drum 30 is mounted on shaft 31, which is rotatably supported in bearings 32 and 33. A second, identical frustoconical drum 50, mounted inversely to the first drum 30, is mounted on shaft 51 which is rotatably supported in bearings 52 and 53. Drum 30 includes a continuous helical groove 34, and drum 50 a corresponding groove 54. A cable connector 35 is disposed at the end of groove 54 near the wide end of drum 30, and a corresponding cable connector 55 is disposed at the end of groove 54 near the wide end of drum 50. A cable 71, wrapped around the drums in grooves 34 and 54, is attached at one end to connector 35 and at its other end to connector 55. The cable is disposed in groove 34 for that portion of its length which is wound about drum 30, and in groove 54 for that portion which is wound around drum 50.

A driver gear 36 is mounted for free rotational movement on drum shaft 31. In order to maintain tension in the system, a flat spirally-coiled clock spring 43 functionally couples drum 30 and driver gear 36. One end of the coiled spring is connected to gear 36, and the other to drum 30, thus rotationally urging gear 36 in one direction and drum 30 in an opposite direction. Driver gear 36, which is freely mounted on shaft 31, is thus driven through spring 43 in order to maintain constant tension through the system loop. Gear 36 in turn engages pinion gear 37 which is mounted on reel shaft 38, itself rotatably supported in one or more bearings 39. A hub 40 is supported on the end of shaft 38, and take-up reel 41 is removably mounted on the hub. A locking pawl 42 locks shaft 38 in place when the tape is removed, in order to maintain system tension as discussed further below.

A second driver gear 56 is mounted on shaft 51, and engages pinion gear 57 which is mounted on reel shaft 58. Reel shaft 58 is, in turn, rotatably supported in one or more bearings 59. In the example illustrated, a supply reel 61 is contained within a removable tape cartridge 63 which in turn is mounted on a hub 60. Hub 60 is linked to supply reel shaft 58 by means of a clutch mechanism 64. Clutch mechanism 64 is mounted on shaft 58 and allows reel 61 to rotate as required when threading the tape during mounting and dismounting of cartridge 63. A locking pawl 62 prevents shaft 58 from rotating when the tape is removed. The locking pawl 62 is positioned to engage the portion of clutch mechanism 64 which is in fixed engagement with shaft 58.

In this embodiment of the invention, the means for driving the tape mechanism comprises a constant speed motor 72, with a smooth cylindrical drum pulley 73 mounted on motor shaft 74. Cable 71 frictionally engages pulley 73, preferably wrapped around it one or more times, and is thereby driven by the rotation of motor 72. The movement of cable 71 in turn causes the rotation of drums 30 and 50, and thereby the rotation of reels 41 and 61.

Magnetic tape 75, initially fully wound on supply reel 61, can be driven by the present apparatus onto take-up reel 41 and back again. Tape 75 passes over a first tape idler 76, over record/playback head 77, over a second tape idler 78, and then onto reel 41. It will be recognized that this is merely illustrative of a tape playing system, and that additional record or playback heads, idlers, and the like could be included.

Arrows in FIG. 2A show the rotational motion of the various components when the tape is driven from reel 61 to reel 41. Motor 72 rotates drum pulley 73 counterclockwise, as viewed in FIG. 2A, to draw the cable from drum 30, causing shaft 31 to rotate clockwise, and., through gears 36 and 37, causing reel 41 to rotate counterclockwise. The rotation of reel 41 enwinds tape 75 and thereby causes reel 61 to rotate clockwise. This rotates drum 50 counterclockwise, through gears 57 and 56, to enwind cable 71 thereon. Clock spring 43 maintains constant tension between drum 30 and gear 36, and thus maintains constant tension throughout the cable-gearing-tape-gearing-cable loop. Thus cable 71 and tape 75 are both maintained in constant tension by clock spring 43, and will therefore move at proportional speeds and in opposite directions as motor 72 drives the cable. An advantage of the present invention is that whether the tape is moving or at rest, it is mechanically maintained at constant tension without the need for any energy expenditure. It can also be readily seen that when tape 75 is disconnected and cartridge 63 removed, it is necessary to lock reel shafts 38 and 58 in position, to maintain the tension on clock spring 43. Thus locking pawls 42 and 62 must always be engaged when the tape is not in place.

The means for maintaining the system tension in the above embodiment is spirally-coiled clock spring 43 located between drum 30 and gear 36. However, it can readily be seen that such a spring device can be funcionally located between any two adjacent energy-transmitting components in the system loop, provided that the spring biases one component against the other to maintain tension. Another means to maintain tension is to make the cable 71 of an elastic material. This acts to bias the rotation of one drum against the other, and thus maintain the system in tension.

Various known gearing and connecting means can be used to modify the system as desired. For example, gears can be used to reverse the direction of rotation of one or more of the components, or to connect the shafts at different angles. If it is desired to have the reel shafts and their corresponding drum shafts concentric, then planetary gearing means can be used to connect the shafts.

In the above embodiment a constant speed motor is used to drive the cable. Alternatively, a motor could be used to drive the tape through a capstan device. However driving the cable rather than the tape is preferred, because it avoids having to compress the tape through a drive means, which can be damaging to the tape. A motor could be used to drive one of the various drive shafts, but a constant speed motor applied to one of these shafts would not produce a constant linear tape movement. When it is not necessary to drive the web at constant speed, such as during fast forward or rewind operations, then such a drive means can be used.

The present web transfer system can be used with many types of flat webs other than magnetic recording tape. These include, but are not limited to, non-magnetic (e.g. paper) recording tape, motion picture film, metal or plastic indicating tape (such as in a tape measure), and the like.

Although the reels and shafts in the above embodiments were separate components, it can readily be seen that the web could be wound directly around a shaft, in which case the reel would be integral with the shaft. This integral reel could have a hub of the same diameter as the shaft, or be in an area of reduced or expanded shaft diameter. Regardless of the structure of the reel and shaft, the above relationships of the radii ratios still apply.

The mechanical transmission of the present invention is used to transmit a program of continuously changing ratios of angular velocity between rotating shafts. In the above embodiments, in which frustoconical drums are disposed inversely to each other, the program corresponds to the change in angular velocity ratios between the reels of a reel-to-reel web transfer system. The web provides a second transmission coupling the shafts, to cause the second shaft to enwind the cable as it is unwound from the first.

Alternatively, the system can be used without a web, and can be used to transmit any desired program of changing ratios of angular velocities between shafts mounted rotatably in bearings. In such a case, a torque mechanism is preferably provided to bias the second shaft to continuously pull the cable from the first shaft. This can comprise a spring, weight or other load mechanically coupled to the second shaft to provide a constant torque in the winding direction, also maintaining the cable under tension. When the first shaft rotates in a winding direction, it pulls the cable, causing it to unwind from and rotate the second shaft. When the first shaft rotates in an unwinding direction, the second shaft will rotate in a winding direction, due to the bias being applied by the torque mechanism, and thereby will draw and enwind the cable on its drum. This action can be analogized to the spring action on a window shade, which continuously exerts a force on the shade shaft in a winding direction.

A typical use for the latter type of transmission is to translate the output of a sensor to a different scale on an indicator. For example, a first shaft can be coupled to a measuring instrument which generates motion in accordance with a logarithmic scale. The second shaft can be coupled to an indicator, such as a chart recorder or the like. By providing the first shaft with a straight cylindrical drum, and the second shaft with a drum having an antilogarithmic profile, the logarithmically varying rotation of the first shaft can be mechanically translated into a linearly varying rotation on the second shaft.

In like manner the profiles of the two drums can be shaped to program the motions of the shafts in a predetermined program of continuously changing angular velocity ratios. The key feature is that by changing the radius from the shaft axis to the point of winding on one shaft in relation to that of the other shaft, the ratio of angular velocities can be changed. The drums can be of the same shape, as in the web transfer embodiments, or of different shapes, as in the scale changing apparatus. The changes in drum diameter should be smooth and continuous to permit even movement of the cable wrapping about the drum. Preferably, the surfaces of the drums are grooved to provide a fixed path for the cable to follow as it winds.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. A system for transporting a web between first and second reels while maintaining tension in the web, said system comprising:

first and second rotatable frustoconical drums, mechanically coupled to said first and second reels, respectively, and mounted inversely to each other so that the wide end of each drum is juxtaposed with the narrow end of the other;

a cable mechanically linking said drums which is attached near the wide end of the first drum, wound partly around that drum, wound partly around the second drum in the same manner, and then attached at a point near the wide end of the second drum, said cable comprising an elastic material; and tensioning means, said tensioning means including said cable, for maintaining tension in the web and cable, wherein the cable and web are mounted such that they move in the opposite directions, whereby as the cable is unwound from a drum the web is enwound onto the associated reel.

2. The system of claim 1 wherein said frustoconical drums are helically grooved, and said cable is wound around the drums in the helical grooves therein.

3. The system of claim 1 wherein said first reel and drum are the mounted on the same shaft, and said second reel and drum are the mounted on the same shaft.

4. The system of claim 1, wherein said first and second reels and drums are mounted on separate shafts, further comprising:

first and second gearing means functionally connecting said first reel to said first drum and said second reel to said second drum respectively.

5. The system of claim 1 wherein the ratio of the radius of a reel, when the web is fully unwound, to its radius, including the web, when the web is fully wound, is equal to the ratio of the radius of its coupled drum, at the point of narrowest cross-section in functional contact with the cable, to its radius at the point of widest cross-section in functional contact with the cable.

6. The system of claim 5 wherein the radii of said first and second reels when fully unwound are equal.

7. The system of claim 1 further comprising means to drive said cable.

8. The system of claim 7 wherein said drive means includes a constant angular speed motor and a mechanically coupled drive pulley.

9. A mechanical transmission system for transferring rotational motion, said transmission system comprising:

first and second juxtaposed drums mounted for rotation, at least one of which is of changing diameter through at least part of its length;

a cable mechanically linking said drums, said cable being attached at one end to the surface of the first drum, wound partly around that drum, wound partly around the second drum in the same manner, and attached at its other end to the surface of the second drum, said cable comprising an elastic material;

means to rotate said second drum in a direction to enwind the cable when the first drum is rotated in a direction to unwind the cable; and tensioning means, said tensioning means including said cable, for maintaining tension in the cable, wherein the cable is mounted on the two drums such that as the cable is wound onto one drum it is unwound from the other drum.

10. The mechanical transmission system of claim 9 wherein the surfaces of said drums are continuously grooved, and said cable is wound around the drums in the grooves therein.

11. The mechanical transmission system of claim 9 further comprising torque means to bias the motion of said second drawn against the pull of the cable, whereby said torque means functions as said means to rotate said second drum and said tensioning means.

12. The system of claim 9 wherein said drums are grooved, and said cable is wound around the drums in the grooves therein.

13. The system of claim 9 wherein said means for rotating said second drum comprises means for driving said cable.

14. The system of claim 13 wherein said means for driving said cable includes a constant angular speed motor and a mechanically coupled drive pulley.

* * * * *